US008375047B2

United States Patent
Narayanan et al.

(10) Patent No.: US 8,375,047 B2
(45) Date of Patent: Feb. 12, 2013

(54) APPARATUS AND METHOD FOR QUERY PRIORITIZATION IN A SHARED NOTHING DISTRIBUTED DATABASE

(75) Inventors: Sivaramakrishnan Narayanan, Sunnyvale, CA (US); Florian Michael Waas, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 314 days.

(21) Appl. No.: 12/751,208

(22) Filed: Mar. 31, 2010

(65) Prior Publication Data

US 2011/0246481 A1 Oct. 6, 2011

(51) Int. Cl.
*G06F 17/30* (2006.01)
(52) U.S. Cl. ..................................... 707/764
(58) Field of Classification Search .................... None
See application file for complete search history.

(56) References Cited

U.S. PATENT DOCUMENTS

| | | | |
|---|---|---|---|
| 7,395,537 | B1 | 7/2008 | Brown et al. |
| 7,502,794 | B2 | 3/2009 | Pelz et al. |
| 2004/0205760 | A1 | 10/2004 | Foote et al. |
| 2005/0187977 | A1* | 8/2005 | Frost ........................ 707/104.1 |
| 2006/0190430 | A1* | 8/2006 | Luo et al. ......................... 707/3 |
| 2008/0140734 | A1* | 6/2008 | Wagner ........................ 707/202 |
| 2008/0162417 | A1 | 7/2008 | Morris et al. |
| 2008/0162583 | A1* | 7/2008 | Brown et al. ................. 707/200 |
| 2009/0055348 | A1* | 2/2009 | Wilding et al. .................... 707/1 |
| 2009/0083276 | A1 | 3/2009 | Barsness et al. |

OTHER PUBLICATIONS

Brown et al., Teradata active system management: high level architectural overview (2007).
DB2 Query Patroller Guide: Installation, Administration and Usage. Version 8.2 IBM Corporation (2003).
Krompass et al., Dynamic workload management for very large data warehouses: juggling feathers and bowling balls. VLDB '07: Proc. $33^{rd}$ international conference on very large data bases, p. 1105-1115. VLDB Endowment , (2007).
Parekh et al., Managing the performance impact of administrative utilities. IBM Research Report, RC22864 (W0308-003) (Aug. 1, 2003) Computer Science.
Powley et al., Autonomic workload execution control using throttling. ICDE Workshops 2010 pp. 75-80 (2010 IEEE).
Schroeder et al., Achieving class-based QoS for transactional workloads. ICDE, p. 153. IEEE Computer Society (2006).
Vaidya. et al., Distributed fair scheduling in a wireless LAN. MOBICOM, p. 167-178 (2000).

* cited by examiner

*Primary Examiner* — Neveen Abel Jalil
*Assistant Examiner* — Kevin L Young
(74) *Attorney, Agent, or Firm* — Barry N. Young (57) ABSTRACT

A shared nothing distributed database system includes a master node and a set of shared nothing nodes. Each shared nothing node includes a node state table stored in memory that characterizes various statements and multiple processes implementing each statement, target resource consumption rate for each process and process activity information. A monitor module executed by a central processing unit processes information in the node state table and adjusts values in the node state table in accordance with priority criteria specifying individual user priority ascribed to a statement. A query associated with a statement is processed in the shared nothing distributed database system in accordance with the priority criteria.

17 Claims, 7 Drawing Sheets

| Statement ID | Process ID | Index | RCR | Last Update | Sleep |
|---|---|---|---|---|---|
| Q1 | P1 | J | 10% | X | N |
| Q1 | P2 |  | 15% | Y | N |
| ⋮ |  |  |  |  |  |
| Q2 | P3 | K | 15% | Z | N |
| Q2 | P4 |  | 2% | A | Y |

| Statement ID | Process ID | Index | RCR | Last Update | Sleep |
|---|---|---|---|---|---|
| Q1 | P1 | J | 10% | X | N |
| Q1 | P2 |  | 15% | Y | N |
| ... |  |  |  |  |  |
| Q2 | P3 | K | 15% | Z | Y |
| Q2 | P4 |  | 2% | A | Y |

APPARATUS AND METHOD FOR QUERY PRIORITIZATION IN A SHARED NOTHING DISTRIBUTED DATABASE

FIELD OF THE INVENTION

This invention relates generally to digital data storage and retrieval. More particularly, this invention relates to query prioritization in a shared nothing distributed database.

BACKGROUND OF THE INVENTION

Figure 1:
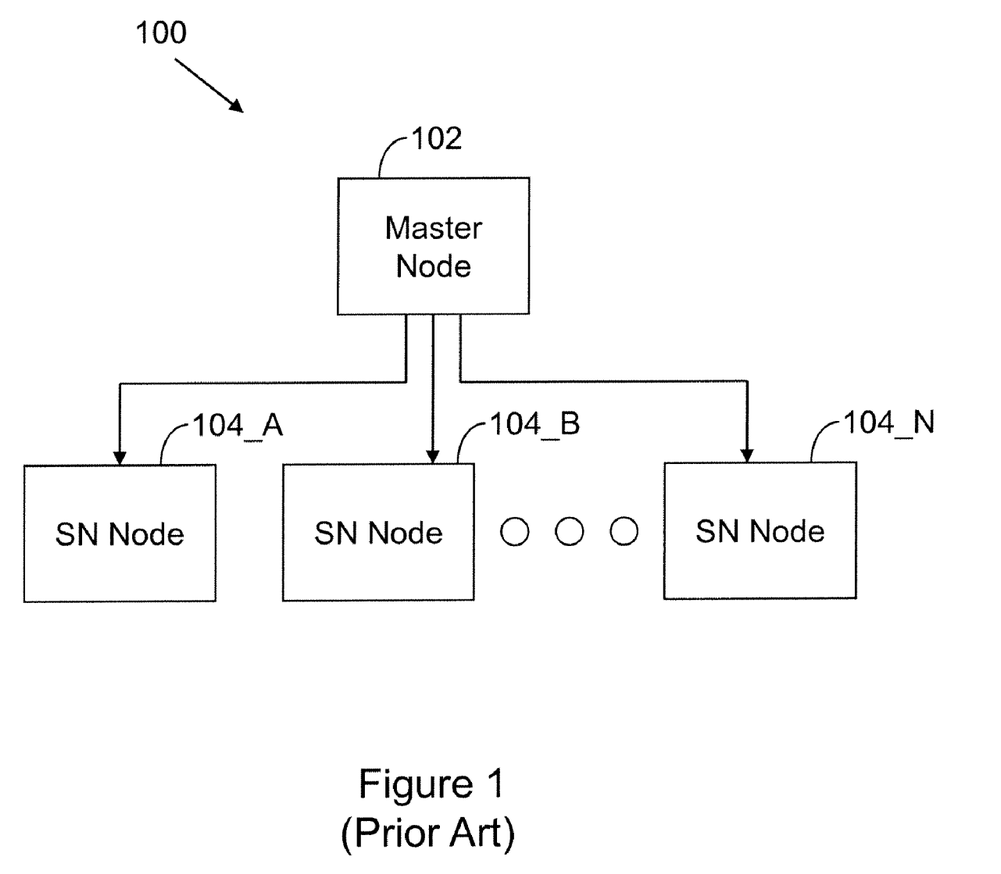
FIG. 1 illustrates a shared nothing system architecture implementing a distributed database in accordance with the prior art.

FIG. 1 illustrates a shared nothing network 100 used in accordance with the prior art. The shared nothing network or architecture 100 includes a master node 102 and a set of shared nothing nodes 104_A through 104_N. Each shared nothing node 104 has its own private memory, disks and input/output devices that operate independent of any other node in the architecture 100. Each node is self sufficient, sharing nothing across the network. Therefore, there are no points of contention across the system and no sharing of system resources. The advantage of this architecture is that it is highly scalable.

Enterprise database systems have been implemented on shared nothing networks. Such enterprise database systems are used to support Business Intelligence (BI) operations. With an ever increasing breadth of data sources integrated in data warehousing scenarios and advances in analytical processing, the classic categorizations of query workloads, such as Online Transaction Processing (OLTP), Online Analytical Processing (OLAP), loading, reporting, or massively concurrent queries have long been blurred. Mixed workloads have become a reality that today's database management systems have to be able to facilitate and support concurrently.

Processing of mixed workloads poses a series of interesting problems because different components of workloads compete for resources and, depending on the resource profiles, often impact each other negatively. This calls for mechanisms that allow users to assign priorities to different workloads that are then enforced by allotting resources accordingly.

The following list illustrates some of the most prominent scenarios of competing workloads with different priorities:

Loading vs. reporting. The quality of analytical processing relies, among other things, on the freshness of data as provided by periodic loads. Loads are typically performed in on-line fashion, i.e., the database system is used for reporting while loads are active. The timely completion of loads is essential for all further analyses and processing. A variant of this scenario are nightly loads. Periodic loads are usually assigned higher priority than reporting workloads.

Tactical vs. strategic analysis. Concurrently run reports may differ in their general importance to the business in terms of timeliness with which the results are needed for business decisions. Tactical analysis reports typically have near-term impact on business and are often assigned higher priority than strategic analysis reports.

Operational workloads. This references operational emergencies where administrators have to act quickly for damage control, e.g., rectify data contamination that is the result of faulty load procedures etc. These workloads should have precedence over other ongoing activity.

Operational safety. By assigning ad-hoc users' workloads appropriately low priorities, administrators can limit the impact of experimental and accidentally complex queries without having to monitor all activity on the system continuously or even deny users access preventatively.

Thus, it would be desirable to provide a mechanism for dynamic prioritization of database queries, where the mechanism appropriately balances competing workloads.

SUMMARY OF THE INVENTION

A shared nothing distributed database system includes a master node and a set of shared nothing nodes. Each shared nothing node includes a node state table stored in memory that characterizes various statements and multiple processes implementing each statement, target resource consumption rate for each process and process activity information. A monitor module executed by a central processing unit processes information in the node state table and adjusts values in the node state table in accordance with priority criteria specifying individual user priority ascribed to a statement. A query associated with a statement is processed in the shared nothing distributed database system in accordance with the priority criteria.

A node of a distributed database includes a node state table stored in memory that characterizes run-time statistics of concurrent database processes. A monitor module is executed by a central processing unit to dynamically alter target resource consumption rates for the concurrent database processes. Each concurrent database process periodically compares a target resource consumption rate to an actual resource consumption rate and backs off resource consumption for a quantum of time when the actual resource consumption rate exceeds the target resource consumption rate.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The invention provides a mechanism that continuously determines and re-computes the ideal target velocity of concurrent database processes based on their run-time statistics to achieve job prioritization. Each process autonomously adjusts its resource consumption using control theory principles. The self-regulating and decentralized design of the system enables effective prioritization even in the presence of exceptional situations, including software defects or unexpected/unplanned query termination with no measurable overhead.

The mechanism automatically balances resources between workloads according to their priorities by controlling the CPU time that is available to individual queries. The technique leverages control theory principles to implement a back-off mechanism where each participating process periodically checks if it has exceeded its current target rate of resource consumption. If so, it engages in a back-off operation by releasing its CPU for a specified quantum of time. Continuous application of this principle results in rapid convergence between actual and ideal resource consumption rate.

Figure 2:
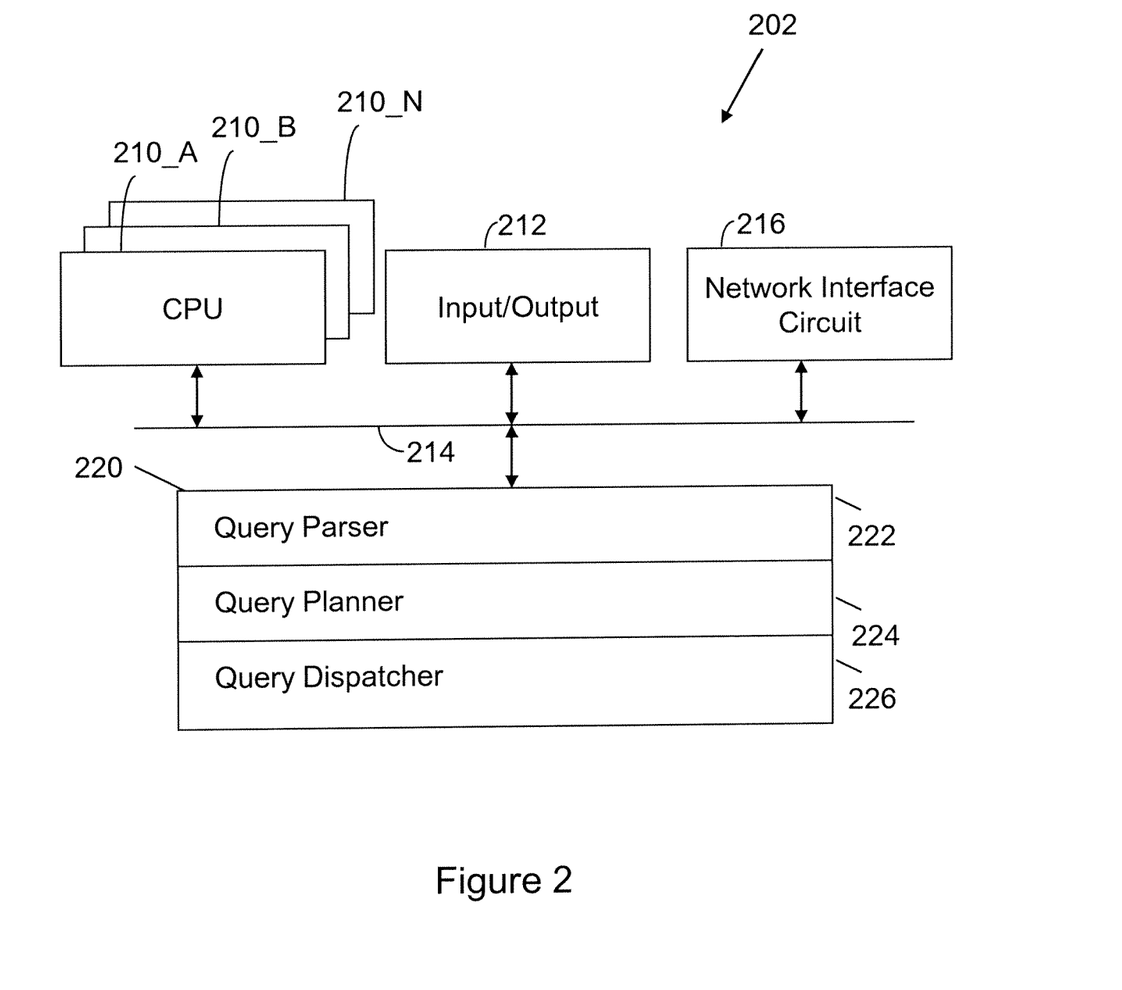
FIG. 2 illustrates a master node of a shared nothing distributed database system utilized in accordance with an embodiment of the invention.

FIG. 2 illustrates a master node 202 configured to implement operations of the invention. The master node 202 includes standard components, such as one or more CPUs 210_A through 210_N. The CPUs are attached to input/output devices 212 via a bus 214. The input/output devices 212 may include standard components, such as a keyboard, mouse, display, printer and the like. A network interface circuit 216 is also connected to the bus 214, allowing the master node 202 to operate in a networked environment.

A memory 220 is also connected to the bus 214. The memory 220 stores executable instructions to implement embodiments of the invention. The memory stores a query parser 222. The query parser 222 includes executable instructions to interpret a database query. The query parser 222 typically checks for correct syntax and builds a data structure (e.g., a tree) to represent the query.

The memory also stores a query planner or query optimizer 224. The query planner 224 processes the output from the query parser and develops a query plan to execute the query. A query plan specifies a set of steps that are used to access or modify the data associated with the query. Details, such as how to access a given data relation, in which order to join data relations, sort orders, and so on, may form part of a query plan. For a given query, a large number of query plans may be generated by varying different constituents of the query plan, such as access paths, join methods, join predicates, and sort orders. A typical data warehouse query may produce several hundreds of millions of possible execution plans. The cost of a query plan can be modeled in terms of various parameters, including, for example, the number of disk accesses and the response time required to fetch data. A query optimizer may evaluate the costs of all possible query plans for a given query and determine the optimal, i.e., most efficient plan for executing the query.

Once a query plan is selected, it is passed to the query dispatcher 226. The query dispatcher 226 deploys the query plan across a set of shared nothing nodes.

Figure 3:
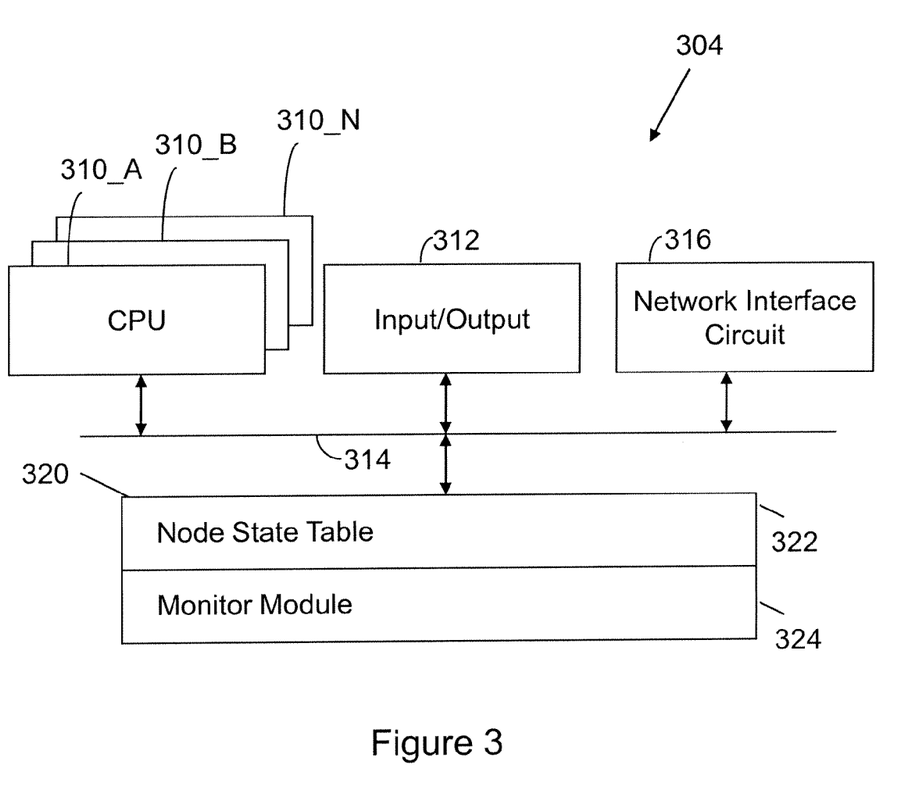
FIG. 3 illustrates a shared nothing node of a shared nothing distributed database system utilized in accordance with an embodiment of the invention.

FIG. 3 illustrates a shared nothing node 304 implemented in accordance with an embodiment of the invention. The shared nothing node 304 also includes standard components, such as a set of CPUs 310_A through 310_N, which are connected to a bus 314. A set of input/output devices 312 are also connected to the bus 314. A network interface circuit 316, also connected to the bus 314, provides connectivity to a network.

A memory 320 is also connected to the bus 314. The memory 320 includes data and executable instructions to implement operations of the invention. A node state table 322 stores state information related to queries that are being processed within the system. A monitor module 324 includes executable instructions to review information in the node state table 322. Based upon its review of the node state table information, the monitor module 324 implements CPU back-off operations to appropriately prioritize executing queries. Further, the monitor module 324 selectively alters the node state table 322 with system state information and dynamic priority adjustments.

Figure 4:
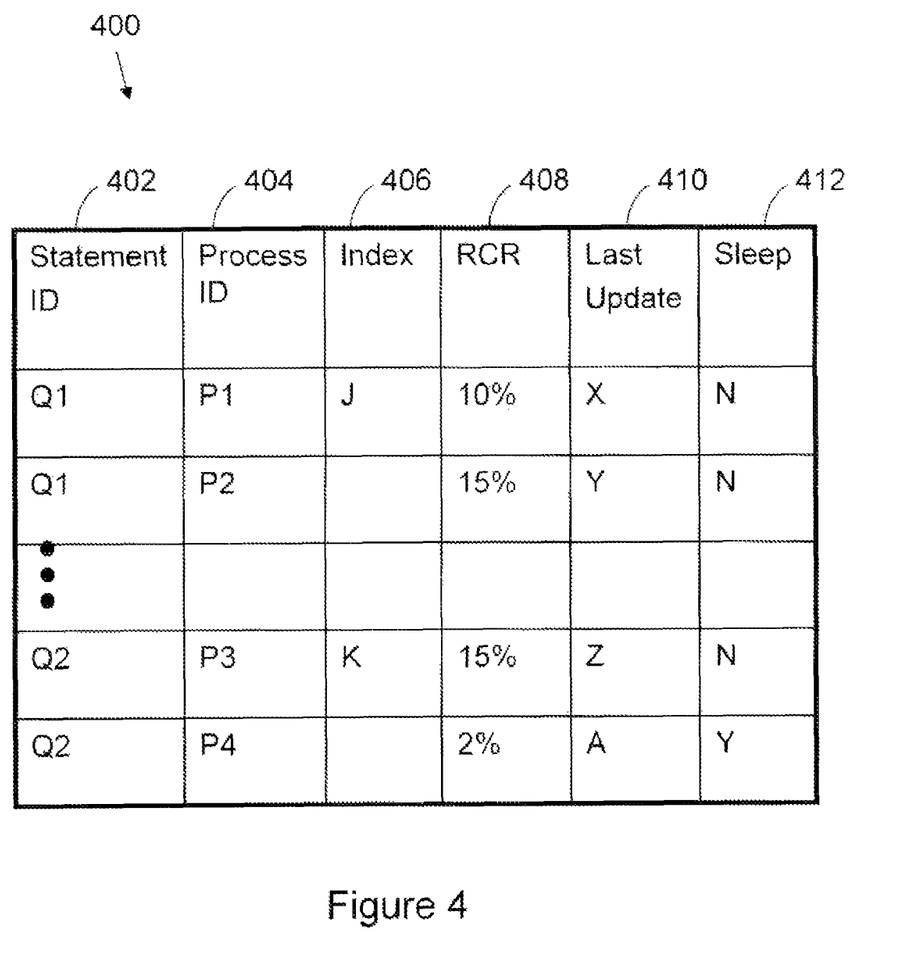
FIG. 4 illustrates a node state table implemented in accordance with an embodiment of the invention.

FIG. 4 provides an example of a node state table 400 that may be used in accordance with an embodiment of the invention. The node state table 400 includes a statement ID column 402. The statement ID column lists the different queries that are currently being processed on a specified shared nothing node. In this example, two queries, Q1 and Q2, are being processed.

The table 400 also includes a process ID column. Each query is typically divided into several parallel processes or threads. In this example, processes P1 and P2 are associated with query Q1 and processes P3 and P4 are associated with query Q2.

In one embodiment of the invention, an index column 406 is used to group statements by a leader. In this example, index value J is used to group processes associated with query Q1, while index value K is used to group processes associated with query Q2.

The table 400 also includes a resource consumption rate (RCR) column. Each entry in the column specifies a target resource consumption rate for a given process. The monitor module 324 periodically alters these values, as discussed below.

The table 400 may also store information characterizing the last process update, as shown in column 410. This value may specify the last time a process was active.

Finally, table 400 includes a column 412 that specifies whether a given process is in a sleep mode. As discussed below, the sleep mode is used to back-off on processing of a specified process in order to meet overall processing priority goals. In the example of FIG. 4, process P4 of question Q2 is in a sleep mode, as indicated by the value Y (Yes).

Figure 5:
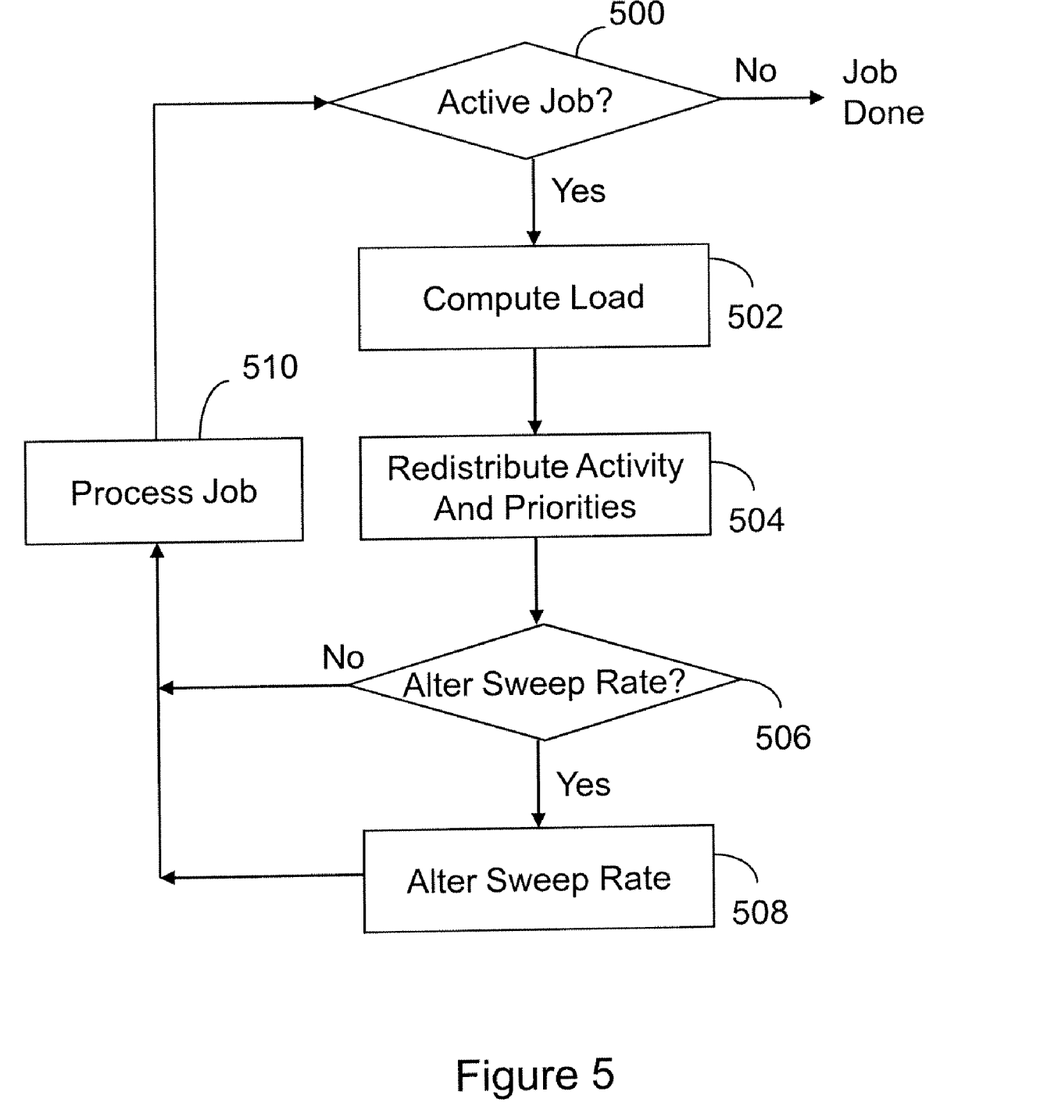
FIG. 5 illustrates processing associated with a monitor module implemented in accordance with an embodiment of the invention.

FIG. 5 illustrates processing operations associated with the monitor module 324. As shown in FIG. 3, the monitor module 324 operates on a shared nothing node. The monitor module 324 operates by accessing the node state table 322, an example of which is shown in FIG. 4. Initially, the monitor module 324 determines if the state table reflects an active job 500. If so, the computational load on the node is computed 502. Activity and priorities are then redistributed 504. For example, RCR values and sleep values may be altered. An inquiry may then be made to determine whether the sweep rate is appropriate. The sweep rate specifies how frequently the node state table is processed. Accordingly, the sweep rate provides granular control over the redistribution of resources on a node. If necessary, the sweep rate is altered 508. After an altered sweep rate and in the event that a sweep rate adjustment is not required, processing proceeds to block 510, which processes a job.

Figure 6:
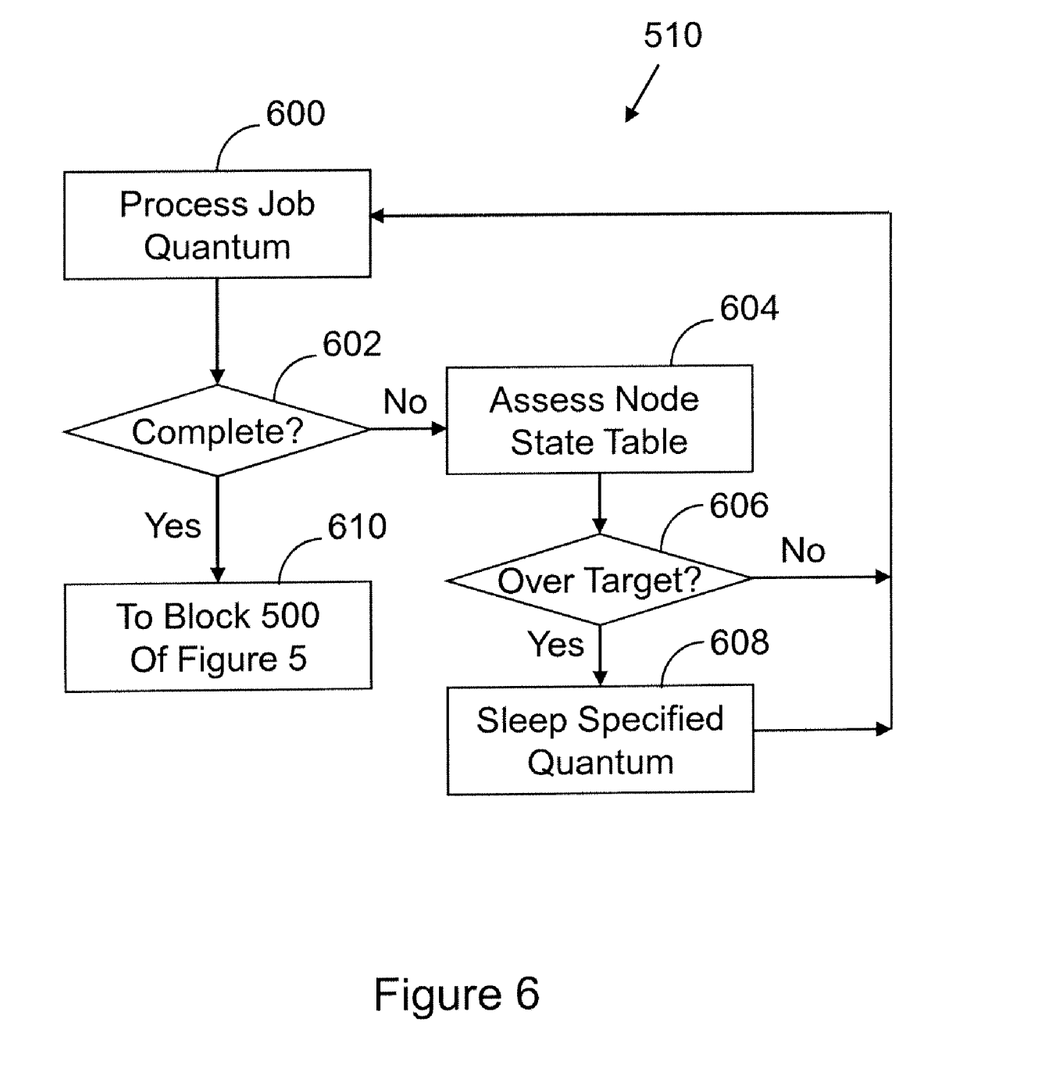
FIG. 6 illustrates job processing operations performed in accordance with an embodiment of the invention.

FIG. 6 illustrates operations associated with block 510. Initially, a portion or quantum of an outstanding job is processed 600. If the job is complete (602—Yes), then control returns to block 500 of FIG. 5 (610). As shown in FIG. 5, if no jobs are active at this point (500—No), the job is done. Otherwise, processing returns to block 502.

Figure 7:
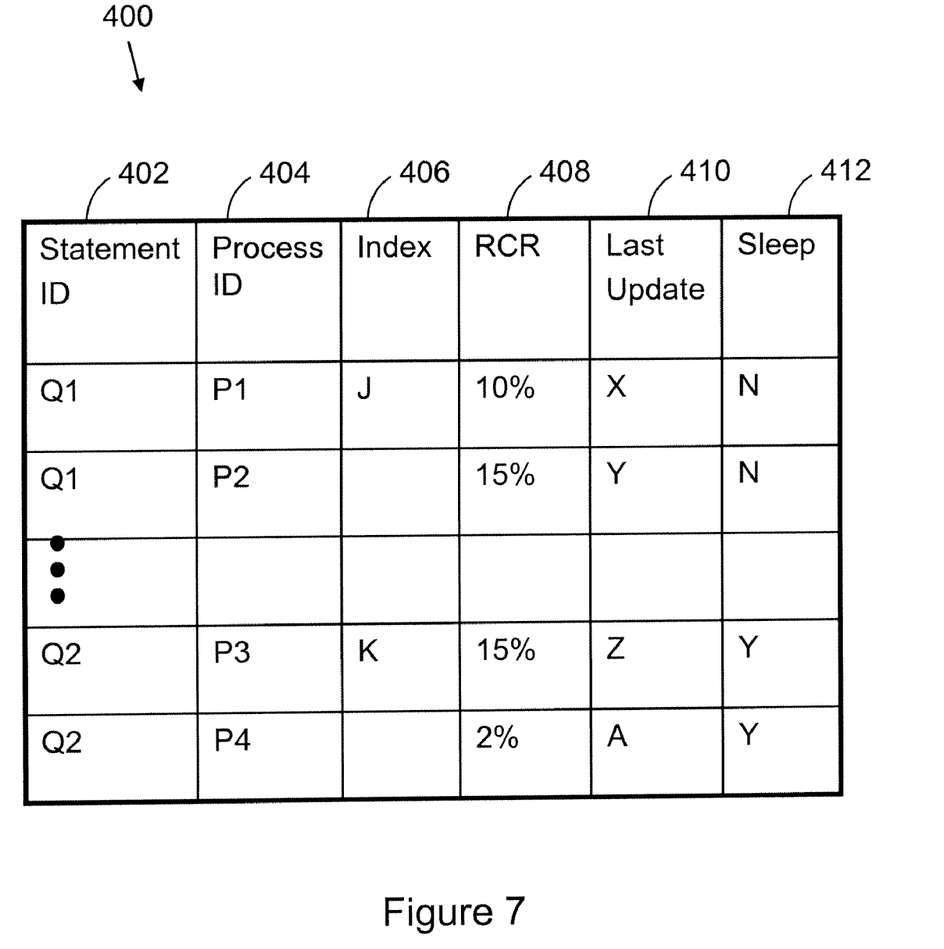
FIG. 7 illustrates an updated node state table utilized in accordance with an embodiment of the invention.

Returning to FIG. 6, if the job is not complete (602—No), then the node state table is assessed 604. If the job is over target (606—Yes), then the job sleeps or backs-off a specified quantum 608. For example, FIG. 7 illustrates that process P3 of question Q2 is placed in a sleep mode. If the job is not over target (606—No), then another quantum of the job is processed at block 600. Control then proceeds to block 602.

The operations of the invention are more fully appreciated through the following discussion. For clarity of exposition, assume that a query always corresponds to a single process or thread. This dictates a serial execution of queries. To express the importance of a query, we introduce the notion of the weight of a query, or weight for short.

Consider the following example. Let Q1 and Q2 be two queries of weight w1 and w2 respectively. When executed individually, one expects the executor processes corresponding to these queries to achieve a CPU utilization of 100%. If w1 is equal to w2, they would each occupy 50% of the CPU over an overlapping interval of time T. If Q1 is twice as important as Q2, i.e., w1=2×w2, one expects Q1 to see a CPU utilization of 66.66% and Q2 33.33% of CPU time in that interval.

Without loss of generality, we will primarily reason using the interval of time T where queries overlap. No assumptions are made regarding their exact start time. Generalizing the above example, consider a set of queries $\{Q_1, Q_2, \ldots, Q_N\}$ with weights $\{w_1, w_2, \ldots, w_N\}$ executing simultaneously in some interval of time T. The CPU time consumed by query Qi should be $$E_i^{(1)} = T \times \frac{w_i}{\sum_1^n w_j}$$

if only one CPU is available. Now, consider the case when K CPU's are available to execute the set of queries. Because of the assumption of a serial executor, a query can utilize at most one CPU during the interval of time T. Therefore, the CPU time spent by query Qi should be $$E_i^{(K)} = \min\left(T, T \times K \times \frac{w_i}{\sum_1^n w_j}\right)$$

guaranteeing that no query can consume more than K of the total 1/K of the total available CPU time. We will abbreviate $E_i^{(K)}$ with Ei in the following when there is no risk of ambiguity.

The formula above does not take into account the utilization of the system. For example, in a system with two CPU's and two queries with weights 500 and 50, we will end up with $E_1$=T and $E_2$=(1/11)T, and, hence, severe underutilization of the second CPU.

To help model utilization explicitly, we introduce a coefficient of assignment such that $\{a_{i,j}\}$ represents the amount of time CPU $P_j$ is assigned to query $Q_i$. All $a_{i,j}$ are subject to the following constraints:

$$\forall i,j\, a_{i,j} \geq 0 \quad (1)$$

$$\forall j \Sigma_i a_{i,j} \leq T \quad (2)$$

$$\forall i \Sigma_j a_{i,j} \leq T \quad (3)$$

Constraint 2 states that the total amount of time spent by all queries on a specific processor is less than the interval of interest T. Constraint 3 implicitly captures the notion that the query can only exploit a single processor at a time. It is rather straight-forward to handle the situation where a query can utilize multiple CPU's at a time, as discussed below.

The maximum possible utilization is denoted by $U_{max}$ and represents the amount of total CPU time that may be utilized during the interval T.

$$U_{max} = \min(K,N) \times T \quad (4)$$

Avoiding under-utilization of CPU's is imperative. To capture this requirement, we add the constraint that the coefficients have to maximize CPU utilization:

$$\sum \sum a_{i,j} = U_{max} \quad (5)$$

Finally, an objective function that captures the notion of proportionate fairness in sharing CPU's is defined.

There are different notions of fairness conceivable. In one embodiment, the following measure is used:

$$F = \frac{1}{K} \times \sum \frac{\sum_j a_{i,j} - E_i}{E_i} \quad (6)$$

This completes the model. The resulting system of equations (1)-(6) is a linear programming problem with N×K variables. The monitor module 324 includes executable instructions to compute a solution.

The monitor module includes independent components: one dynamically determines ideal Resource Consumption Rate (RCR) for all processes involved; the other enforces it on all processes. The RCR is a function of priority, which may be expressed as an attribute in a Workload Management infrastructure.

The invention utilizes a collaborative design paradigm where all processes assess their actual RCR frequently, compare it against their individual target RCR, and adjust their own resource intake accordingly. That is, as discussed above, and as shown in FIGS. 5 and 6, the monitor module redistributes activity and priorities in accordance with a configurable sweep rate, which dictates the frequency of priority changes. Observe that the responsibility for enforcing target RCR's is distributed across all participating processes without creating a central bottleneck.

In order to determine the target RCR for any process accurately a full overview of all processes that are actively competing for CPU at this point in time is required. That is, the number of query processes present and the aggregation of their weights is determined. This operation is represented by the compute load block 502 of FIG. 5. The fact that the number of processes may be large makes gathering this information a delicate task that has the potential to impact the surveyed processes or to incur significant CPU load by itself. Fortunately, it is sufficient to determine approximate values since CPU usage fluctuates rapidly. Finding an appropriate trade-off between the accuracy of the approximation and the statistical significance of the data collected is an empirical task that relies on the implementation of the underlying database system.

For the approximate assessment of competing processes, we observe that not all query processes are competing for CPU bandwidth. In particular, processes that are blocked because they are waiting to acquire locks currently held by other processes or are stalled by a producer/consumer relationship and are waiting for data, do not need to be accounted for. In short, only processes that are making progress and are actually able to adjust their resource consumption need to be taken into account. Therefore, we can simply combine a process' periodic assessment of its RCR with reporting its data to a central instance, i.e., a data structure in shared memory. Given the high frequency with which processes check and, hence, report their RCR this mechanism establishes a fairly accurate approximation of all RCR's.

The gathered data is then used to determine target RCR's asynchronously by "sweeping" the node state table periodically and re-computing all active processes' RCR's. The targets are then retrieved by the processes by piggy-backing a request on the reporting of the actual RCR. Note that this takes care of any process that is blocked for any reason and should not be taken into account for CPU allotment.

The sweeper operation of the monitor module may be implemented as a database service process. For simplicity of exposition we assume it is aware of all the queries currently executing in the system. That is, all queries register with it at start time and un-register once they are terminated. The sweeper is run periodically and scans the shared memory data structure that contains all reported RCR's of currently running queries to determine the weights of all active queries; and the fair share of CPU for each active query. Determining if a query is active is done by looking at the time stamp (e.g., last update 410 of table 400) of the last reporting of its RCR. If no new data has been reported within a small grace period, the query is considered inactive and unable to use CPU, e.g., it is blocked, waiting, etc. Once the set of active queries has been determined, one can compute the fair share of CPU time as a target RCR by solving the previously described optimization problem. Unfortunately, formal methods for solving Linear Programming problems like the Simplex method or Ellipsoid method are prohibitively expensive given the high frequency at which the problem needs to be solved (with newly arriving queries and queries frequently transitioning between being active and inactive). Therefore, a lightweight heuristic may be used to solve the following simplified variant of the original problem.

In the original problem we did break out the exact assignment of a query to a CPU. However, in practice the assignment of processes to a CPU is best left to the scheduler of the operation system kernel. This simplifies the problem and we introduce $$r_i = \frac{\sum_j a_{i,j}}{T}$$

as the fraction of CPU time available to $Q_i$ regardless of which CPU executes the process, thus, $r_i \in (0,1]$. $r_i$ will become the target RCE later on. Note that this eliminates T from the equations. This is important because T may not be constant between subsequent invocations of the sweeper. The utilization constraint from Equation 4 can then be stated as $$\sum_i r_i = \min(K, N)$$

i.e., the fractions sum up to either the number of CPU's, in which case we maximized system utilization, or to the number of query processes; whichever is smaller.

This condition reflects the discrete nature of a CPU as a resource: no matter how high the priority of a query process, it can utilize only a single CPU at a time. We refer to the query process as pegging a CPU when it has an extremely high priority vis-a-vis the other queries and deserves exclusive access to a CPU. Note that this case arises only when K>1. The following pseudo code may be employed by the monitor module 324 to solve for ri's, given active queries and their weights. First, we remove all peggers and adjust the remaining total weight. In the second part of the code we assign the ri's of the non-peggers proportionally.

The algorithm runs in O(N) (K is constant for a database installation), and is overall fairly lightweight. Typical numbers of N are usually in the dozens or low hundreds. Furthermore, we implemented some simple optimization to cache the resultant ri's and reuse them if there has been no change in the active queries or their weights.

| Approximation of target RCR |
|---|
| $W \leftarrow \Sigma w_i$ <br> $\forall i\ r_i \leftarrow -1$ <br> for j = 1 to K do <br>     pegger $\leftarrow$ false <br>     for i = 1 to N do <br>         if $w_i * K \geq W$ then <br>             pegger $\leftarrow$ true {Query pegging a CPU} <br>             $W \leftarrow W - w_i$ <br>             $r_i \leftarrow 1.0$ <br>             $K \leftarrow K - 1.0$ <br>         end if <br>         if¬pegger then <br>             goto rest: <br>         end if <br>     end for <br> rest: <br> for i = 1 to N do <br>     if $r_i = -1$ then <br>         $r_i \leftarrow \frac{w_i}{W}$ <br>     end if <br> end for |

The back-off heuristic is a sub-routine of the monitor module 324, which may form a portion of a query execution engine. The back-off module issues sleep ( ) system calls to achieve its fair share of the CPU usage as calculated by the sweeper process.

It is not straightforward to calculate the amount of sleep time required from a database process. The reason for that is uncertainty; no mathematical system can precisely model ureal physical system. Therefore, control theory principles are used. Feedback control is a mechanism of applying input to cause system variables to conform to desired values called the reference. In this situation, sleep time is the input, a system variable is actual CPU usage and a reference is the desired CPU usage ri.

The back-off module maintains a variable sleepTime that routinely sleeps that amount. It also routinely checks its CPU usage using system calls. If the actual CPU usage varies from the required CPU usage, the control function changes sleepTime accordingly. The following control function may be used:

$$\text{sleepTime}_{m+1} = \text{sleepTime}_m \times \text{Actual CPU Share}/r_i$$

In one embodiment, only the CPU usage since the last check is considered. If the actual CPU share is higher than the desired value, sleepTime grows. This simple control function works very well in practice and converges rapidly. Also, this function dampens the system sufficiently without causing underutilization.

As explained before, the back-off module also records a reporting timestamp in the shared state that enables discerning active and inactive queries. This mechanism covers both regular and exceptional situations, e.g., when a query crashes due to a software defect or is waiting on database locks. As soon as a waiting query awakens after acquiring its locks, it will enter the set of active queries by reporting to the sweeper.

The invention has been implemented in the Greenplum Parallel Database (GPDB), which has a shared-nothing, massively parallel processing (MPP) architecture. It enables parallel execution of a query using both intra-operator and inter-operator parallelism.

A unit of intra-operator parallelism is a segment—an operator is parallelized by partitioning its inputs. Each segment has a dedicated set of CPUs assigned to it and does not share state information with other segments. The execution of a single query may involve database processes spread across segments (shared nothing nodes). The solution is implemented on a per-segment basis; that is, database processes belonging to the same segment compete with one another for the segment's CPUs. Thus, there is no expensive communication over the network.

The techniques of the invention are applicable to CPU bound queries. If a query is primarily I/O or network bound, it may not be able to utilize all the CPU assigned to it by the sweeper leading to underutilization of CPU capacity. This problem is typically circumvented by relaxing admission control; that is, increasing the number of concurrent queries so that the CPU is not underutilized. Admission control policies must be aware of the characteristics of the query so as to derive maximum value out of a database system.

An interesting problem arises in the scenario that an extremely high priority query and a low priority query share a single CPU. This situation leads to extremely long sleep times for the low priority query so that the high priority query receives an overwhelming share of the CPU. However, if the high-priority query suddenly becomes inactive, the low priority query may continue to sleep leading to underutilization of CPU capacity—this is the inertia problem. The back-off module circumvents this problem by sleeping in smaller chunks of time and routinely checking if there has been a change in its RCR. If there has been a change in its RCR, the process breaks out of its sleep early.

Another challenge is that different operating systems support different resolutions in their implementation of the sleep system call. Processes that deserved high RCR values needed to sleep for extremely tiny intervals and occasionally the sleep implementation did not support such fine resolution. This leads to an increase in sleep time which may cause a dip in CPU usage. This leads to perturbation in the CPU usage of these high priority processes. This does not negatively impact higher-level metrics like response time of high-priority queries.

An interesting use case of this mechanism is that the database system may be configured to use only part of the entire CPU available on a system. For example, if an enterprise wishes to run a database and another CPU intensive application on the same hardware, it can limit the CPU impact of the database by artificially lowering K, the number of CPUs known to the back-off mechanism. This leads to conservative target RCRs by the mechanism, thus freeing up the CPU for other applications.

Those skilled in the art will appreciate that the techniques of the invention are applicable to shared-everything and shared-disk systems. Indeed, the implementation in such systems is simpler. In addition, other system resources, aside from the CPU, may be controlled, such as input/output bandwidth.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A shared nothing distributed database management system, comprising:
 a master node; and
 a plurality of shared nothing nodes, wherein each shared nothing node having a central processing unit that executes concurrently a plurality of queries, each query being implemented by multiple processes, and each shared node comprises:
 a node state table stored in memory that characterizes the multiple processes implementing each query, the node state table including a target resource consumption rate value and process activity information for each process, and
 a monitor module executed by the central processing unit that processes information in the node state table, comparing actual resource consumption rate with target resource consumption rate, and dynamically adjusting at successive time intervals during query processing target resource consumption rate values in the node state table for each of said multiple processes in accordance with priority criteria specifying a priority ascribed to a query, and processing the query in accordance with the priority criteria, and wherein the central processing unit utilizes the target resource consumption values in the node state table by providing a corresponding share of central processing unit resources for the multiple processes during each successive time interval.

2. The shared nothing distributed database system of claim 1 wherein the process activity information includes time stamp information that indicates a last time in which each process was active.

3. The shared nothing distributed database system of claim 1 wherein the process activity information includes sleep status that indicates a current activity state of each process.

4. The shared nothing distributed database system of claim 1 wherein the monitor module computes central processing unit load during each successive time interval prior to each adjustment of target resource consumption rates.

5. The shared nothing distributed database system of claim 1 wherein the monitor module alters process target resource consumption rates to maximize utilization of central processing unit resources.

6. The shared nothing distributed database system of claim 1 wherein the monitor module has a configurable sweep frequency defining the frequency with which the monitor module periodically sweeps the node state table and re-computes the resource consumption rates of processes.

7. The shared nothing distributed database system of claim 1 wherein each of the processes asynchronously adjusts its utilization of central processing unit resources by backing off its consumption for a quantum of time when its actual consumption rate exceeds its target consumption rate.

8. A node of a shared nothing distributed database management system, the shared nothing node comprising:
a node state table stored in memory that characterizes run-time statistics of concurrent database process of queries, including characterizing for said concurrent database processes corresponding target resource consumption rates and process activity information; and
a monitor module executed by a central processing unit that periodically compares each concurrent database process's target resource consumption rate in the node state table to its actual resource consumption rate, dynamically alters at successive time intervals during query processing in accordance with a priority assigned to each query process activity information and target resource consumption rates in the node state table for the concurrent database processes and backs off resource consumption for a quantum of time when its actual resource consumption rate exceeds the target resource consumption rate, wherein the backing off provides a corresponding share of central processing unit resources to each database process.

9. The node of claim 8 wherein the monitor module computes target resource consumption rates for each concurrent database process as a function of a weight of a corresponding query.

10. The node of claim 8 wherein the monitor module computes target resource consumption rates to maximize central processing unit utilization.

11. The node of claim 8 wherein the monitor module computes target resource consumption rates with proportionate fairness in sharing central processing units in accordance with query priority.

12. The node of claim 8 wherein the monitor module implements a control mechanism with an input of resource sleep time, a system variable of actual resource utilization and a reference of a desired resource utilization.

13. The node of claim 12 wherein the resource is central processing unit utilization.

14. A method of managing concurrent execution of a plurality of queries in a shared nothing database node, each query comprising multiple processes, comprising:
establishing in a node state table a target resource consumption rate value and process activity state for each of the multiple processes of each query;
monitoring, by a processor, actual resource consumption rates for active process and dynamically altering at successive time intervals during execution of queries the target resource consumption rate values in the node state table based upon said monitoring and based upon priorities of corresponding queries; and
adjusting the actual resource consumption rates of the processes according to the corresponding target resource consumption rate values in said node state table such that a proportionate share of resources are utilized by the processes during each of said successive time intervals.

15. The method of claim 14, wherein said adjusting actual resource consumption rates comprises each process adjusting its actual utilization of a resource according to its corresponding target resource consumption rate value in the node state table.

16. The method of claim 14, wherein said adjusting comprises adjusting the actual resource consumption rates of active processes during each successive time interval to maximize utilization of a resource.

17. The method of claim 14 further comprising periodically sweeping the node state table and re-establishing all resource consumption rate values in said node table.

* * * * *